United States Patent [19]

French et al.

[11] Patent Number: 4,724,313

[45] Date of Patent: Feb. 9, 1988

[54] DUAL RESOLUTION SENSOR FOR SIGNAL TRACKING AND THE LIKE

[75] Inventors: John A. French; Ray N. Moses, both of Huntsville, Ala.

[73] Assignee: The Boeing Company, Seattle, Wash.

[21] Appl. No.: 42,536

[22] Filed: Apr. 27, 1987

Related U.S. Application Data

[63] Continuation of Ser. No. 704,071, Feb. 21, 1985, abandoned.

[51] Int. Cl.⁴ .................................................. G01J 1/20
[52] U.S. Cl. ................................. 250/203 R; 356/343
[58] Field of Search ....................... 250/203 R, 211 R; 356/222, 343; 354/429, 439

[56] References Cited

U.S. PATENT DOCUMENTS

| | | | |
|---|---|---|---|
| 3,700,905 | 10/1972 | Parkin et al. | 250/203 |
| 4,099,875 | 7/1978 | McMahon et al. | 356/343 |
| 4,107,530 | 8/1978 | Brumfield | 250/203 |
| 4,311,388 | 1/1982 | Roiret | 356/343 |
| 4,366,377 | 12/1982 | Notthott et al. | 250/578 |
| 4,476,383 | 10/1984 | Fukuhara | 356/222 |

Primary Examiner—David C. Nelms
Assistant Examiner—William L. Oen
Attorney, Agent, or Firm—Finnegan, Henderson, Farabow, Garrett & Dunner

[57] ABSTRACT

An optical sensor for viewing a signal image at a wide range of angles relative to the optical axis. The sensor characterized by having a detector for receiving the focused image thereon and having an inner member and outer annulus. The inner member and outer annulus function independently of each other or in parallel with each other.

3 Claims, 5 Drawing Figures

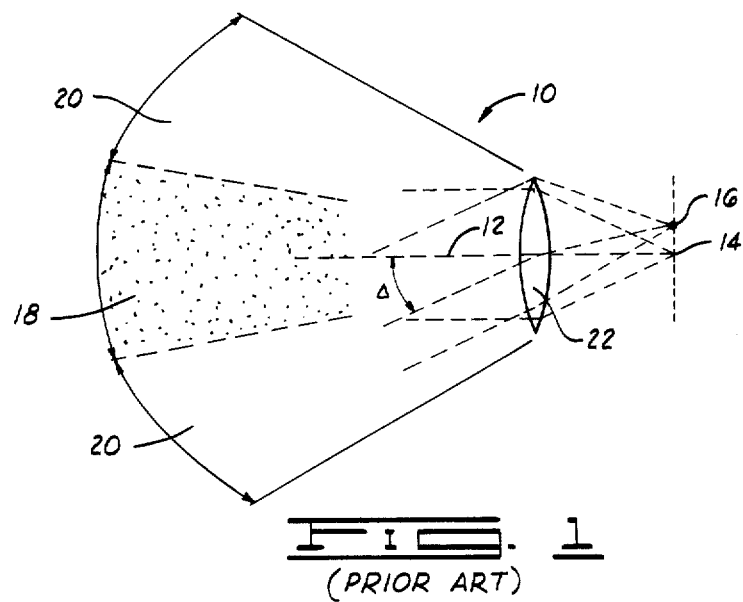
FIG. 1
(PRIOR ART)
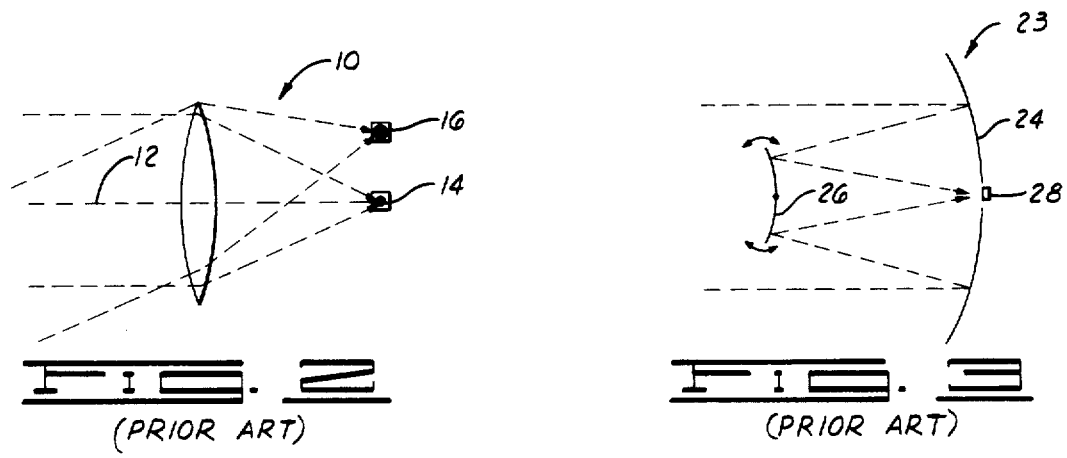
FIG. 2
(PRIOR ART)
FIG. 3
(PRIOR ART)
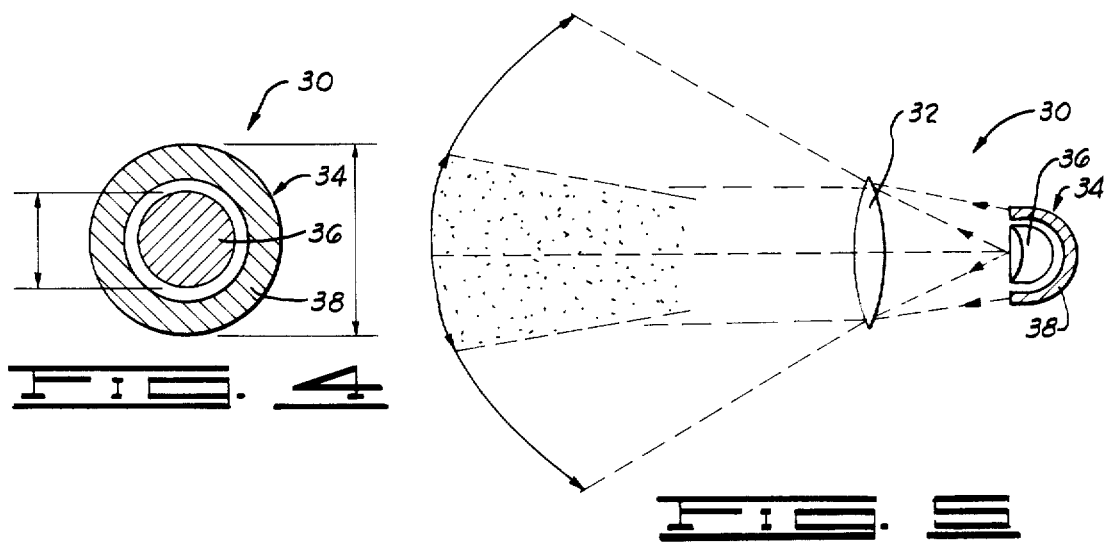
FIG. 4
FIG. 5

DUAL RESOLUTION SENSOR FOR SIGNAL TRACKING AND THE LIKE

This application is a continuation of application Ser. No. 704,071, filed Feb. 21, 1985, now abandoned.

BACKGROUND OF THE INVENTION

This invention relates to an optical sensor and more particularly but not by way of limitation to a sensor for viewing a signal image wherein the sensor's detector can operate at a wide range of angles relative to the optical axis.

Heretofore, when a sensor was required to view a signal at a wide range of angles from the optical axis, the image blur circle increased roughly proportional to the angle formed by the optical axis and the line of sight of the object. Therefore, detectors were designed which were large enough to encompass the overall range of angles searched with poor resolution at the greater angles from the optical axis.

In the following U.S. Pat. Nos., U.S. Pat. No. 3,110,816 to Kaisler et al, U.S. Pat. No. 3,218,909 to Fain, U.S. Pat. No. 3,415,994 to Fitti, Jr., U.S. Pat. No. 4,193,688 to Watkins, U.S. Pat. No. 4,210,807 to Ruger, U.S. Pat. No. 4,317,998 to Dore and U.S. Pat. No. 4,381,149 to Hair et al various types of optical infrared detectors are disclosed for viewing signal images. None of these prior art devices disclose the unique features and advantages of the subject dual resolution sensor.

SUMMARY OF THE INVENTION

The dual resolution sensor provides a detector having an inner circular member for detecting small angles of boresight for example, 0 to 6 degrees where the blur circle will be small and a large percentage of the energy is intercepted by this member. The detector further includes an outer separated annulus used in combination with the inner member for detecting signals at larger angles for example, 6 to 12 degrees where the blur circle will be increased and energy impinged on both the inner and outer members.

The invention results in a sensor with a detector having good resolution at small angles and the ability of collecting all the signal energy at larger angles.

The optical sensor for viewing a signal image at a wide range of angles relative to the optical angle includes a reflector for receiving the image thereon and focusing the image. A detector for receiving the focused image is used in combination with the reflector and includes an inner member and a separate outer annulus member. The inner and outer members are functionally independent of each other and operate in parallel with each other.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a prior art sensor having a lens with detector illustrating high and low resolution zones.

FIG. 2 illustrates the sensor shown in FIG. 1 with the detector off axis and on axis with the optical axis of the lens.

FIG. 3 illustrates a prior art sensor with a pair of reflectors for focusing the image on a detector.

FIG. 4 illustrates a front sectional view of the dual resolution sensor.

FIG. 5 illustrates a side view of the dual resolution sensor with reflector and image received thereon.

DETAILED DESCRIPTION OF THE DRAWINGS

In FIG. 1 a prior art optical sensor system is shown and designated by general reference numeral 10. The sensor 10 is used to view objects at a wide range of angles relative to an optical axis 12. It should be noted from reviewing FIG. 1 and FIG. 2 when the image is focused along the optical axis 12 a small blur circle 14 appears. By moving the detector off axis with an increased angle, indicated by Δ, a large blur circle 16 appears. A shaded zone 18 is shown when the detector is used for viewing a signal at an angle from 0 to 6 degrees. This area 18 is a high resolution zone for greater detection. When the angles increase from 6 to 12 degrees a low resolution zone 20 is shown providing a poor resolution as to signal detection.

For sensors using discrete detectors such as hotspot and infrared seekers, the detector's size quite often is designed to intercept all or nearly all the energy received at the maximum angle of interest, including both high and low resolution zones 18 and 20. Thus, the detector is optimized for the worse case blur circle as indicated by the large blue circle 16 and is non-optimum when used for detecting objects at angles closer to the optical angle or in the high resolution zone 18. This problem becomes more pronounced as lenses, such as lens 22, are designed to cover wider angles such as in aerospace activities. The result is that angular resolution of such a sensor as sensor 10 is limited at all angles by the detector's size even though the lens 22 itself has better resolution at smaller angles.

In FIG. 3 another prior art electrodynamic scanner 23 and stabilizier designed by Reinhold is shown. This type of seeker uses a double reflector optical design having a first reflector 24 and a second reflector 26 with the reflector 24 and 26 tilted in order to permit the seeker 23 to search rapidly over wide angles. The image is then focused on a detector 28. Typical design such as this will develop an image blur circle which will vary from 0.1 mm for a boresight condition to 0.5 mm when the reflectors 24 and 26 are tilted to about 5 degrees from the boresight position. These blur signals may typically correspond to optical angular resolution of 0.1 to 0.5 milliradians. This is to say that the optical reflector or analogous lens would be capable of resolving two point energy sources which are spaced by one foot at a distance of 10,000 feet for 0.1 mr or 5 feet to 10,000 feet for 0.5 mr. This resolution is of considerable significance to the system designer. Since it is impractical to change the detector 28 whenever the angle of optics is changed, a signal detector must be large enough to encompass the five millimeter blur circle normally used at all angles resulting in five milliradian resolution.

Because the prior art designs have generally accepted the above mentioned limitations, this has resulted in less than optimum sensor performance. The system must either limit the angle of use or suffer decreased resolution over an entire angle of view. In FIG. 4 the subject dual resolution sensor for signal tracking and detecting is designated by general reference numeral 30. The sensor 30 includes a lens 32 shown in FIG. 5 for providing a focused image on the sensor 30. The detector 34 includes a circular center member 36 surrounded by and separated from a outer annulus member 38 with the inner member 36 and outer member 38 acting independently of each other or in parallel.

Through the use of two sections of the detector 34, the sensor 30 provides good resolution at small angles and still collects all of the energy at larger angles. At small angles of the boresight, for example, 0 to 6 degrees, the blur circle will be small and a large percentage of the energy will be intercepted by the center circular member 36. At larger angles, for example, 6 to 12 degrees, the blur circle will be large and the energy will impinge on both the inner and outer members 36 and 38. In operational use involving small angles only the center member 36 will be used. When larger angles are involved both the inner and outer members 36 and 38 will be used summing the output of both these individual detectors into a single channel.

In a typical system's application, searching functions may be accomplished by using combination of the detector 30, but target identification and/or tracking functions can benefit greatly by the use of the smaller inner circular member 36 in the high resolution angle zone. After searching and detecting a signal, a target tracking algorithm will be implemented to provide precise directional data. If this signal is detected in the low resolution zone the entire optical system combining the lens 32 with the inner and outer members 36 and 38 of the detector 30 will be oriented so the signal can be examined in the high resolution zone.

Changes may be made in the construction and arrangement of the parts or elements of the embodiments as described herein without departing from the spirit or scope of the invention defined in the following claims.

What is claimed is:

1. An optical sensor for viewing a single target image at a wide range of angles to the optical axis, the sensor comprising:

reflector means for receiving and focusing the image; and a detector assembly disposed to receive said focused image, said detector assembly, comprising:

an inner member having a generally circular detection surface; and an outer member disposed in annular relation to said inner member and having an annular detection surface generally in the same plane as said circular detection surface, said inner member functioning independently of the outer member to detect and track said target image at a predetermined angle or less relative to the optical axis, and said members cooperatively functioning to detect and track said target image over a range of angles greater than said predetermined angle.

2. The sensor as described in claim 1 wherein the inner member is used at small angles of detection from zero to six degrees from the optical axis.

3. The sensor as described in claim 1 wherein the inner and outer members are used together and combining the output into a single channel for detecting larger angles from 6 to 12 degrees from the optical axis.

* * * * *

UNITED STATES PATENT AND TRADEMARK OFFICE
CERTIFICATE OF CORRECTION

PATENT NO. : 4,724,313
DATED : February 9, 1988
INVENTOR(S) : John A. French et al It is certified that error appears in the above-identified patent and that said Letters Patent is hereby corrected as shown below:

Column 2, line 38, "stabilizier" should read --stabilizer--.

Signed and Sealed this

Seventh Day of June, 1988

Attest:

DONALD J. QUIGG

Attesting Officer

Commissioner of Patents and Trademarks